(12) United States Patent
Nielsen et al.

(10) Patent No.: US 12,123,400 B2
(45) Date of Patent: Oct. 22, 2024

(54) MODIFYING CONTROL STRATEGY FOR CONTROL OF A WIND TURBINE USING LOAD PROBABILITY AND DESIGN LOAD LIMIT

(71) Applicant: VESTAS WIND SYSTEMS A/S, Aarhus N (DK)

(72) Inventors: Anders Steen Nielsen, Aarhus C (DK); Søren Hove Sørensen, Hinnerup (DK); Tobias Gybel Hovgaard, Ry (DK)

(73) Assignee: VESTAS WIND SYSTEM A/S, Aarhus N (DK)

( * ) Notice: Subject to any disclaimer, the term of this patent is extended or adjusted under 35 U.S.C. 154(b) by 613 days.

(21) Appl. No.: 17/286,806

(22) PCT Filed: Oct. 9, 2019

(86) PCT No.: PCT/DK2019/050297
§ 371 (c)(1),
(2) Date: Apr. 19, 2021

(87) PCT Pub. No.: WO2020/078518
PCT Pub. Date: Apr. 23, 2020

(65) Prior Publication Data
US 2021/0372371 A1    Dec. 2, 2021

(30) Foreign Application Priority Data

Oct. 18, 2018    (DK) .......................... PA 2018 70681

(51) Int. Cl.
*F03D 7/04* (2006.01)
*F03D 17/00* (2016.01)
(52) U.S. Cl.
CPC .............. *F03D 7/046* (2013.01); *F03D 7/045* (2013.01); *F03D 7/047* (2013.01); *F03D 7/048* (2013.01);
(Continued)

(58) Field of Classification Search
CPC . F03D 7/04; F03D 7/042; F03D 7/043; F03D 7/045; F03D 7/046; F03D 7/047;
(Continued)

(56) References Cited

U.S. PATENT DOCUMENTS

2006/0273595 A1    12/2006  Avagliano et al.
2009/0295160 A1*   12/2009  Wittekind ............... F03D 7/046
                                                           290/55
(Continued)

FOREIGN PATENT DOCUMENTS

CN    101881255 A    11/2010
CN    107532568 A    1/2018
(Continued)

OTHER PUBLICATIONS

PCT International Search Report for Application No. PCT/DK2019/050297 dated Jan. 23, 2020.
(Continued)

*Primary Examiner* — Yongjia Pan
(74) *Attorney, Agent, or Firm* — Patterson + Sheridan, LLP (57) ABSTRACT

The present disclosure relates to controlling an operation of a wind turbine. A first plurality of extreme load measures indicative of extreme loads experienced by at least part of the wind turbine during the first period of time are determined and a load probability characteristic is then determined based on a statistical analysis of the distribution of the first plurality of extreme load measures. A control strategy for controlling the operation of the wind turbine is then modified based at least in part on a comparison of the load probability characteristic and a design load limit and the wind turbine is then subsequently controlled in accordance with the modified control strategy for a second period of time.

14 Claims, 5 Drawing Sheets

(52) U.S. Cl.
CPC .......... *F03D 17/011* (2023.08); *F03D 17/028* (2023.08); *F03D 17/034* (2023.08); *F05B 2270/331* (2013.01)

(58) Field of Classification Search
CPC ...... F03D 7/048; F03D 17/005; F03D 17/006; F03D 17/0065; F03D 17/00; F03D 17/011; F03D 17/028; F03D 17/0285; F03D 17/029; F03D 17/031; F03D 17/032; F03D 17/033; F03D 17/034; F03D 17/036; F03D 7/0224; F03D 7/0272; F03D 7/0292; F03D 7/044; F05B 2260/80; F05B 2260/82; F05B 2260/821; F05B 2260/84; F05B 2270/331; F05B 2270/332; Y02E 10/72; G05B 15/00; G05B 15/02; G05B 17/02; G05B 19/00; G05B 19/0425; G05B 19/048; G05B 19/058

See application file for complete search history.

(56) References Cited

U.S. PATENT DOCUMENTS

| | | | |
|---|---|---|---|
| 2010/0283246 A1* | 11/2010 | Christensen | F03D 7/0272 290/44 |
| 2011/0018271 A1 | 1/2011 | Karikomi et al. | |
| 2012/0282093 A1* | 11/2012 | Rebsdorf | F03D 7/0228 416/1 |
| 2013/0184838 A1* | 7/2013 | Tchoryk, Jr. | G01S 17/58 700/31 |
| 2013/0187383 A1 | 7/2013 | Esbensen et al. | |
| 2014/0288855 A1* | 9/2014 | Deshpande | F03D 7/0292 702/34 |
| 2014/0328678 A1* | 11/2014 | Guadayol Roig | F03D 7/0224 416/43 |
| 2015/0005966 A1* | 1/2015 | Gerber | F03D 7/02 700/287 |
| 2015/0086356 A1* | 3/2015 | Perley | F03D 7/0292 416/1 |
| 2015/0093242 A1* | 4/2015 | Enevoldsen | F03D 80/55 416/1 |
| 2015/0115608 A1* | 4/2015 | Draper | F03D 80/82 290/44 |
| 2016/0196370 A1* | 7/2016 | Spruce | F03D 7/046 703/18 |
| 2016/0237988 A1* | 8/2016 | Perley | F03D 7/028 |
| 2017/0321654 A1* | 11/2017 | Zheng | F03D 7/028 |
| 2018/0171978 A1* | 6/2018 | Spruce | G05B 9/02 |

FOREIGN PATENT DOCUMENTS

| | | | |
|---|---|---|---|
| CN | 107667220 A | 2/2018 | |
| CN | 107850048 A | 3/2018 | |
| EP | 2249030 A2 | 11/2010 | |
| ES | 2354135 T3 * | 3/2011 | .......... F03D 7/0224 |
| WO | 2011157271 A2 | 12/2011 | |
| WO | 2020078518 A1 | 4/2020 | |

OTHER PUBLICATIONS

PCT Written Opinion of the International Searching Authority for Application No. PCT/DK2019/050297 dated Jan. 23, 2020.
Danish Patent and Trademark Office 1st Technical Examination for Application No. PA 2018 70681 dated Apr. 24, 2019.
Chinese Patent Office, First Office Action for Chinese Patent Application No. 201980083585.9, dated Feb. 2, 2024.

* cited by examiner

MODIFYING CONTROL STRATEGY FOR CONTROL OF A WIND TURBINE USING LOAD PROBABILITY AND DESIGN LOAD LIMIT

FIELD OF THE INVENTION

The present invention relates to a method and control system for controlling an operation of a wind turbine.

BACKGROUND OF THE INVENTION

In general, a wind turbine or a wind turbine park is operated with the aim to obtain maximum yield of the capital invested in it, and consequently the wind turbine control systems are configured to maximize the output power, i.e. to operate the wind turbine to capture the maximal power that is available in the wind, with due regard to keeping the wind turbine within operational limits.

During operation a wind turbine experiences varying climatic conditions and the control system of the wind turbine is designed to take into account these variations. To that end, existing wind turbines may include a monitoring system which monitors the operational and climatic conditions and controls the operation of the wind turbine to maximise power output, whilst keeping within safe operating limits.

However, the inventors have realised that the safe operating limits are based on design assumptions for safe operation, which may or may not match the actual safe operational limits of each installed wind turbine. Therefore, there is a need for an improved way of controlling wind turbine operation that better accounts to the true safe operating limits of the wind turbine.

SUMMARY OF THE INVENTION

A first aspect of the present disclosure provides a method of controlling an operation of a wind turbine, the method comprising: controlling the operation of the wind turbine in accordance with a control strategy for a first period of time; obtaining a first plurality of extreme load measures indicative of extreme loads experienced by at least part of the wind turbine during the first period of time; determining, by statistical analysis, a load probability characteristic based on a distribution of at least the first plurality of extreme load measures; comparing the load probability characteristic and a design load limit; modifying the control strategy based at least in part on the comparison of the load probability characteristic and the design load limit; and controlling the operation of the wind turbine in accordance with the modified control strategy for a second period of time. By modifying the control strategy in this way, the actual extreme loading experienced by the wind turbine over the first period of time may be used to safely reduce the safety margin employed by the control strategy. By reducing the safety margin, a larger span of control should be possible, which should allow the wind turbine to be driven harder and generate more power.

The load probability characteristic may comprise a max extreme load value indicative of a value of extreme load corresponding to a threshold percentile of the distribution of the plurality of extreme load measures.

The comparison of the load probability characteristic and the design load limit may comprise a difference between the max extreme load value and the design load limit.

Modifying the control strategy may be further based at least in part on a magnitude and/or a sign of the difference between the max extreme load value and the design load limit.

The design load limit may be based at least in part on a material failure load value, a siting uncertainty value and a simulated safety margin.

The plurality of extreme load measures may comprise a plurality of estimates of extreme load, and wherein the method further comprises: receiving a plurality of operational state measurements of the wind turbine during the first period of time; and determining the plurality of extreme load measures based at least in part on the plurality of operational state measurements.

The method may further comprise: obtaining a second plurality of extreme load measures indicative of extreme loads experienced by at least part of the wind turbine during the second period of time; determining an updated load probability characteristic based on a distribution of the first plurality of extreme load measures and the second plurality of extreme load measures; comparing the updated load probability characteristic against the design load limit; further modifying the control strategy based at least in part on the comparison of the updated load probability characteristic against the design load limit; and controlling the operation of the wind turbine using the further modified control strategy for a third period of time.

The control strategy and the modified control strategy defined within a model predictive control, MPC, routine. Modifying the control strategy based at least in part on the comparison of the load probability characteristic and the design load limit may comprises adjusting at least one cost weighting within the MPC routine based at least in part on the comparison of the load probability characteristic and the design load limit. Additionally, or alternatively, modifying the control strategy based at least in part on the comparison of the load probability characteristic and the design load limit may comprise adjusting at least one constraint of the MPC routine based at least in part on the comparison of the load probability characteristic and the design load limit.

The distribution of at least the first plurality of extreme loads may be determined based on the first plurality of extreme loads and a simulated load distribution.

The statistical analysis may further comprise a Bayesian analysis.

A second aspect of the present disclosure provides a computer program configured to perform the method according to the first aspect, when executed on a processor of an electronic device.

A third aspect of the disclosure provides a control system for a wind turbine, comprising: a controller configured to: control the operation of the wind turbine using a control strategy for a first period of time: obtain a first plurality of extreme load measures indicative of extreme loads experienced by at least part of the wind turbine during the first period of time; determine, by statistical analysis, a load probability characteristic based on a distribution of the first plurality of extreme load measures; compare the load probability characteristic against a design load limit; modify the control strategy based at least in part on the comparison of the load probability characteristic against the design load limit; and control the operation of the wind turbine using the modified control strategy for a second period of time.

The controller may be further configured to: obtain a second plurality of extreme load measures indicative of extreme loads experienced by at least part of the wind turbine during the second period of time; determine an updated load probability characteristic based on a distribution of the first plurality of extreme load measures and the second plurality of extreme load measures; compare the updated load probability characteristic against the design load limit; further modify the control strategy based at least in part on the comparison of the updated load probability characteristic against the design load limit; and control the operation of the wind turbine using the further modified control strategy for a third period of time.

A fourth aspect of the present disclosure provides a wind turbine comprising the control system of the third aspect.

BRIEF DESCRIPTION OF THE DRAWINGS

Embodiments of the invention will now be described with reference to the accompanying drawings, in which.

DETAILED DESCRIPTION OF EMBODIMENT(S)

The control strategy used to control the operation of wind turbines is typically initially set based on simulated turbine loading, with safety built in to account for siting uncertainties and simulated safety margins. However, the inventors have realised that the built in safety often results in the wind turbine being operated too conservatively, which may result in wasted power generation opportunities. Therefore, they have devised a technique of measuring/estimating extreme loads experienced over a period of time and performing a statistical analysis on the distribution of the extreme loads in order to identify the hidden, unnecessary safety margin built into the control strategy. The control strategy can then be modified to reduce that hidden safety margin, which should allow greater flexibility in control and an increase in power generation of the wind turbine, without jeopardising safety.

Figure 1:
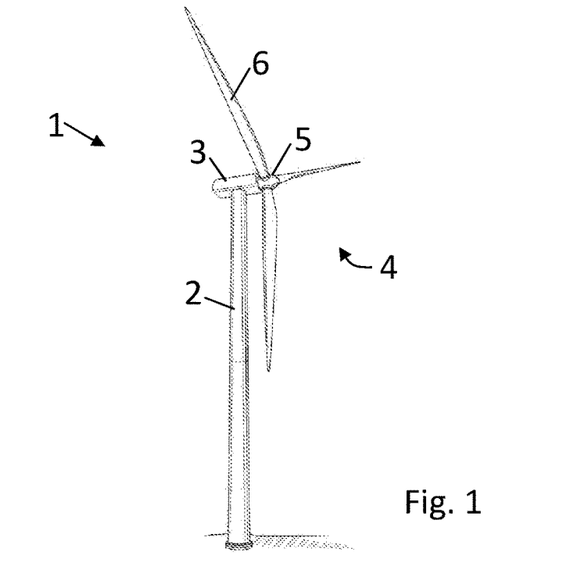
FIG. 1 illustrates an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3, In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside the turbine and communicatively connected.

The wind turbine 1 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
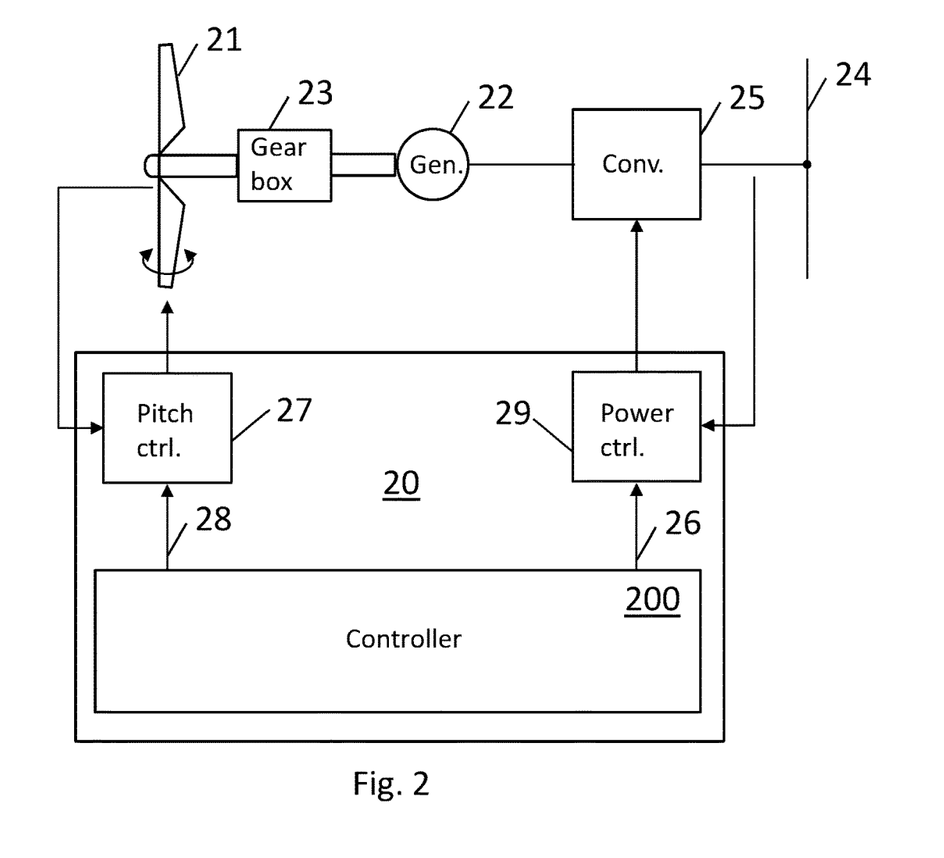
FIG. 2 illustrates an embodiment of a control system together with elements of a wind turbine.

FIG. 2 schematically illustrates an embodiment of a control system 20 together with elements of a wind turbine. The wind turbine comprises rotor blades 21 which are mechanically connected to an electrical generator 22 via gearbox 23. The electrical power generated by the generator 22 is injected into a power grid 24 via an electrical converter 25. The electrical generator 22 can be a doubly fed induction generator, but other generator types may be used. Moreover, a gearbox need not be present.

The control system comprises a number of elements, including at least one controller 200 with a processor and a memory, so that the processor is capable of executing computing tasks based on instructions stored in the memory. In general, the wind turbine controller 200 ensures that in operation the wind turbine generates a requested power output level. This is obtained by adjusting the pitch angle and/or the power extraction of the converter. To this end, the control system 20 comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades.

Figure 3:
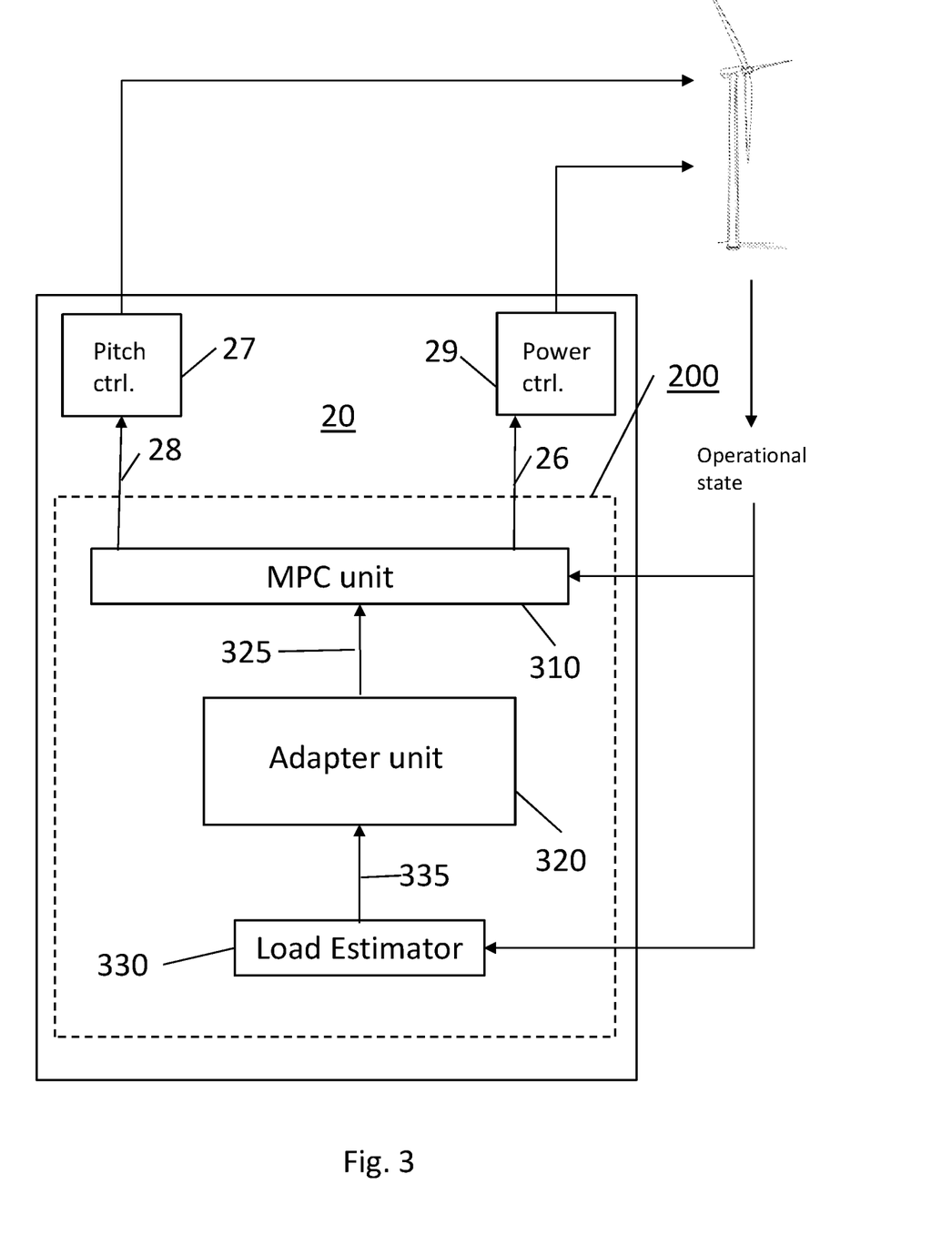
FIG. 3 illustrates details of a controller in the control system of FIG. 2.

FIG. 3 schematically illustrates details the controller 200 in accordance with an embodiment. The controller 200 comprises a model predictive control (MPC) unit 310, an adapter unit 320 and a load estimator 330.

The MPC unit 310 is configured to determine a control signal, such as signals 26 and 28, for controlling an operation of the wind turbine, such as blade pitch and/or power extraction of the converter. The MPC unit 310 determines the control signal based at least in part on an MPC routine that utilises a cost function comprising a cost relating to one or more types of load of the wind turbine (for example, the load on one or more different parts/components of the wind turbine) and/or one or more measures of wind turbine operation (for example, the operational state, as explained in more detail later). The skilled person will readily appreciate how MPC routines can be used to determine the control signal. However, by way of a brief explanation, MPC is a multivariable control algorithm that uses an optimization cost function J over the receding prediction horizon, to calculate the optimal control moves.

The optimization cost function may be given by:

$$J=\min(\lambda_1 * \text{Load} - \text{Power})$$

In this example, 'Load' is the load cost relating to one or more types of loading of the wind turbine, for example load on the tower and/or load on a blade, etc. Additionally or alternatively, 'Load' may be the load cost relating to one or more operational measures of the wind turbine. $\lambda_1$ is the cost weighting corresponding to 'Load'. 'Power' is the electrical power output of the wind turbine. Therefore, by minimising $\lambda_1 * \text{Load} - \text{Power}$, the cost function is optimised for achieving the best power output for particular levels of load on the wind turbine.

It will be readily appreciated that in an equivalent implementation, an optimization benefit function may be used for exactly the same outcome. An equivalent optimization benefit function may be given by $$B = \max(\text{Power} - \lambda_1 * \text{Load})$$

Therefore, it will be understood that the term 'cost function' as used throughout disclosure encompasses the equivalent 'benefit function'.

The MPC unit 310 in FIG. 3 is configured to receive an operational state signal from the wind turbine, comprising one or more measures of one or more operational states of the wind turbine. However, the MPC unit 310 may additionally or alternatively be configured to receive at least one load measure 335 from the load estimator 330. The operational state signal may comprise, for example, one or more measures of the pitch value, the rotor angular speed, the tower top position, power output, derivatives of those parameters, etc. The measurements in the operational state signal may be based on sensor readings from sensors arranged to measure sensor data relating to the wind turbine's physical state values. The MPC unit 310 then utilises the received operational states (and/or measures of load) and the MPC optimisation routine to determine the control signal.

Initially, the MPC routine may be configured to have an initial control strategy based on design assumptions. The initial control strategy may be defined in the MPC routine by way of various parameters being set in the MPC routine, such as cost weightings and/or constraints. The design assumptions that are utilised in order to set the initial control strategy shall now be explained with reference to FIG. 4.

Figure 4:
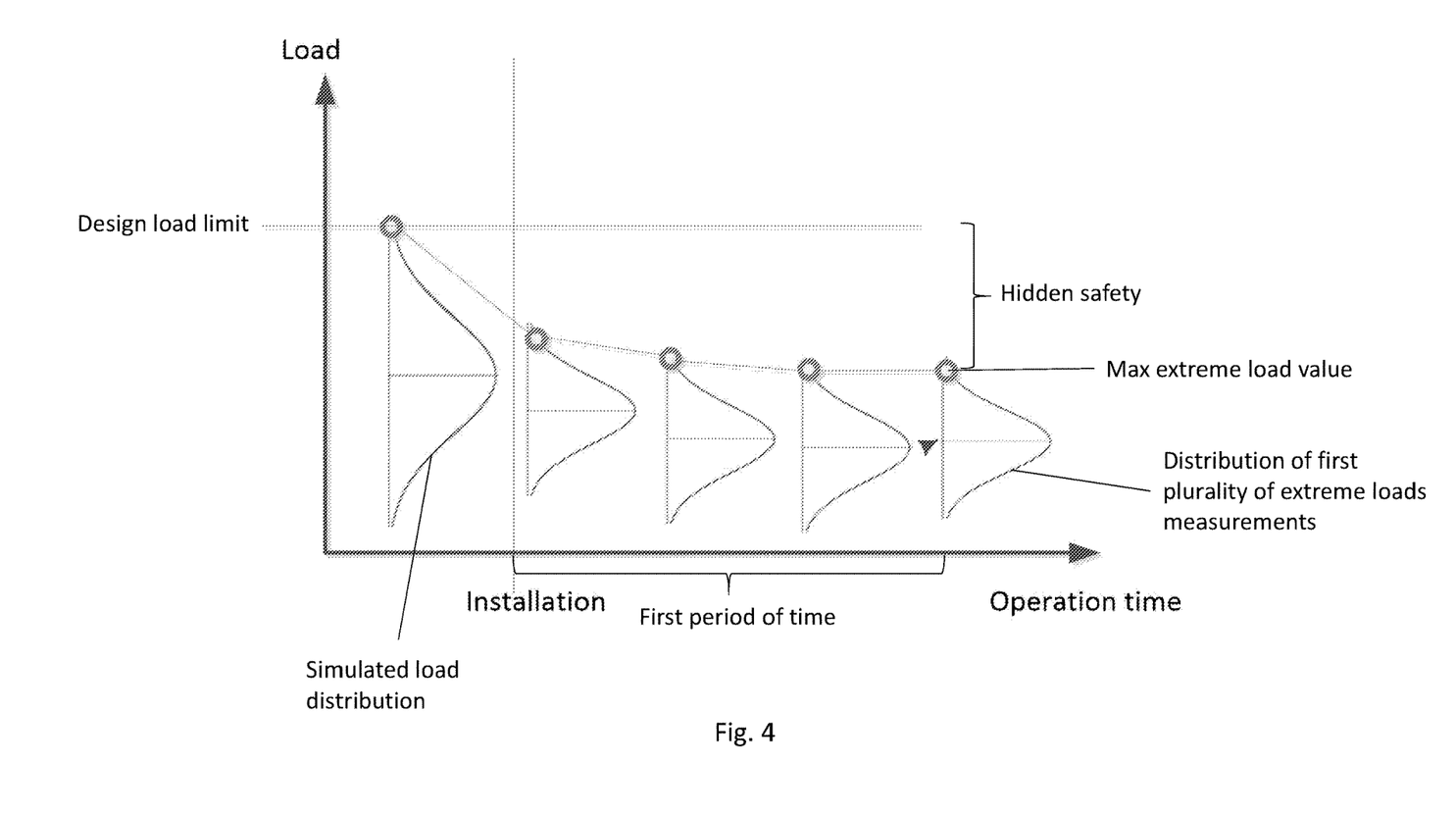
FIG. 4 illustrates a graphical representation of a distribution of a first plurality of extreme load measures determined by the controller of FIG. 3 distributions.

FIG. 4 shows a representation of load on the wind turbine (y-axis) against operation time of the wind turbine (x-axis). Before installation of the wind turbine, a simulation of a load distribution over time may be determined, which is represented in FIG. 4 as 'simulated load distribution'. This represents how a particular loading (for example, tower loading, or blade loading, etc) may vary over time. When a failure threshold percentile of the distribution is equal to or above the design load limit, then failure of the wind turbine part may be expected. For example, when the failure threshold percentile is 90%, if the top 10% or more of the distribution is above the design load limit then failure of the part may be expected. If only the top 9%, or only the top 5%, etc of the distribution is above the design load limit, then failure of the part may not be expected. Therefore, during the design phase, the MPC routine may be configured to define an initial control strategy that is expected to result in the simulated load distribution being positioned safely relative to the design load limit (i.e., so that the failure threshold percentile of the simulated distribution is at or below the design load limit). However, since the consequences of turbine failure due to over-loading the wind turbine are severe, siting uncertainty (for example, uncertainty in the environmental conditions that will be experienced by the wind turbine, such as wind field and/or climate uncertainty) and a safety margin based on the simulations are also built into the initial control strategy to help ensure that after installation, the wind turbine is not accidentally put at risk by virtue of the initial control strategy being too aggressive.

Returning to FIG. 3, the load estimator 330 is configured to receive the operational state signal from the wind turbine. At least one load measure 335 relating to one or more parts of the wind turbine is then determined and provided to the adapter unit 320 and the MPC unit 310. For example, the at least one load measure 335 may relate to the load on the tower, or the load on a blade, etc. The at least one load measure 335 may be regularly determined based on the current operational state signal, for example every second, or every three seconds, or every ten seconds, etc. It will be appreciated that in an alternative, the operational state may comprise a direct measure of one or more loads on the wind turbine, in which case the controller 200 may not comprise the load estimator 330 and the adapter unit 320 may instead directly receive the at least one load measure in the operational state of the wind turbine.

In the controller 200 of the present disclosure, an adapter unit 320 has been implemented and configured to determine an extreme load measure for each type of load measure received from the load estimator 330. For example, the load measure 335 may comprise measures of the load on the turbine tower and the adapter unit 320 may receive a new load measure 335 every second. The adapter unit 320 may determine an extreme load measure indicative of the extreme load experienced by the turbine tower during a particular amount of time, such as a 10 minute period, based on the received load measures 335 during that particular amount of time. The extreme load measure in this example is the maximum load during the particular period of time. It will be appreciated that a 10 minute period is merely one non-limiting example and different lengths of time may alternatively be used. The adapter unit 320 continues to determine extreme load measures for a first period of time, such as one month, or three months, or six months, or one year, etc. Thus, the adapter unit 320 will determine a first plurality of extreme load measures over the first period of time—one extreme load measure every 10 minutes in this particular example.

A distribution of these extreme load measures can be seen in FIG. 4. In particular, after installation of the wind turbine, more and more extreme load measures are determined as time goes on. As can be seen, over the course of the first period of time, as more and more extreme load measures are added to the distribution, the variance within the distribution reduces and the mean levels gradually tends to a lower level than the simulated distribution. This is because there is no siting uncertainty or aeroelastic model uncertainty added to the distribution of the first plurality of extreme load measures, since the first plurality of extreme load measures are based on actual on-site measurements.

At the end of the first period of time, the max extreme load value of the distribution of first plurality of extreme load measurements is determined. This is the value of extreme load that corresponds to the failure threshold percentile (for example, the 90% percentile) of the distribution. The inventors have realised that when this statistical analysis on actual extreme load measures is performed, the max extreme load value tends to be well below the design load limit, representing a hidden, unnecessary safety built into the control strategy of the MPC unit 310. This means that the MPC unit 310 could safely allow larger extreme loads without risking safety, which would give a larger span of control for the MPC unit 310 and potentially allow the wind turbine to generate more power.

Consequently, the adapter unit 320 generates adapted MPC settings 325 in order to modify the control strategy of the MPC unit 310 based at least in part on a comparison of the max extreme load value and the design load limit. Adapted MPC settings 325 may be based at least in part on a magnitude and/or sign of the difference between the design load limit and the max extreme load value (for example, if the max extreme load value is well below the design load limit, the adapted MPC settings 325 may be set to make a large change to the MPC control strategy, whereas if the difference is small, the adapted MPC settings 325 may be set to make a small change to the MPC control strategy).

This statistical analysis to determine a distribution from which the max extreme load value is determined may be further based on the simulated load distribution and may utilise Bayesian analysis. For example, the simulated load distribution may represent 'prior knowledge' in the Bayesian analysis and that distribution may effectively be modified by performing a Bayesian process using the first plurality of extreme load measures. In this sense, the distribution determined based on the simulated load distribution and the first plurality of extreme loads is a 'posterior probably distribution'. The max extreme load value may be then determined from that distribution.

After the modification of the control strategy, the wind turbine will then be operated using the modified control strategy, which should result in the future extreme load distributions shifting upwards on the graph represented in FIG. 4, thereby closing the gap between the max extreme load value and the design load limit and enabling greater power output without jeopardising safety.

Optionally, after the control strategy has been modified, a second plurality of extreme load measures may be determined by the adapter unit 320 during a second period of time that follows the first period of time. An updated max extreme load value may then be determined based on a distribution of the first plurality of extreme load measures and the second plurality of extreme load measures (for example, the max extreme load value may be found by finding the load value corresponding to the 90% of the distribution of the first and second plurality of extreme load measures) Optionally, this distribution may be determined using a Bayesian analysis, where the distribution prior to the start of the second period of time represents 'prior knowledge' in the Bayesian Analysis (that distribution may itself have been determined earlier using a Bayesian analysis of the simulated load distribution and the first plurality of extreme loads, as described earlier), and the second plurality of extreme loads is used to modify that distribution to obtain a 'posterior probably distribution', using which the updated max extreme load value is determined. The control strategy may then be further modified based at least in part on a comparison of the updated max extreme load value and the design load limit and subsequent control of the wind turbine may be based on the further modified control strategy. In this way, the control strategy may be gradually refined over time as the wind turbine ages and more and more extreme load data become available.

The first period of time and the second period of time, and any further periods of time during which extreme load measures are determined and used in statistical analysis to determine further updated max extreme load values, may be any suitable period of time. For example, they may be of the order of seconds, minutes, hours, days, months or years, such that the control strategy may be updated and refined with any suitable frequency.

Figure 5:
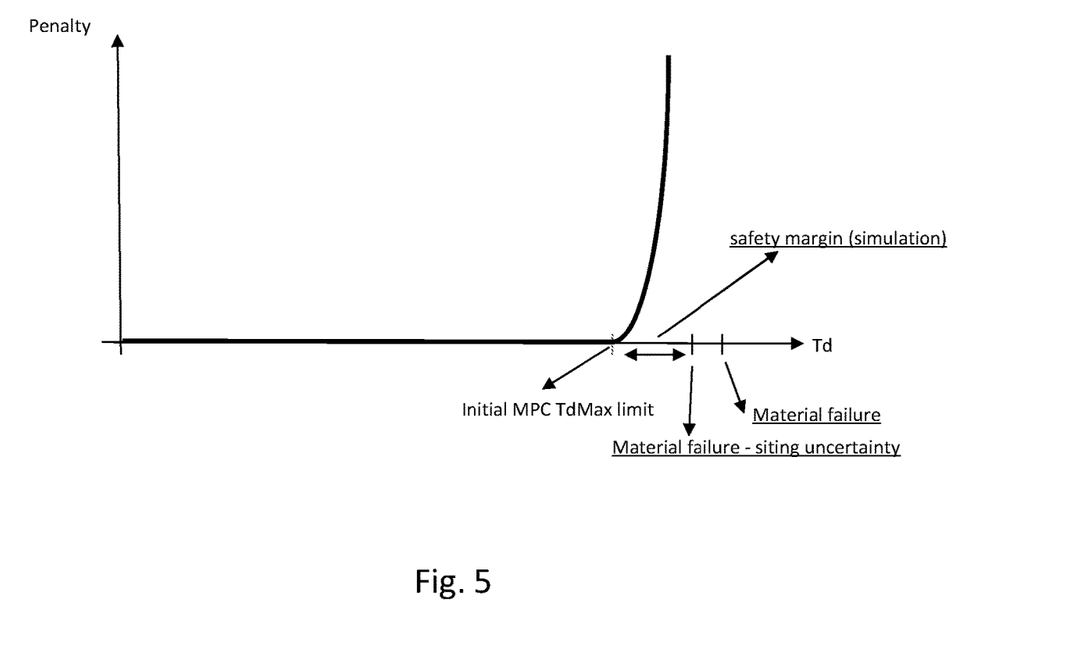
FIG. 5 illustrates an example initial control strategy of the controller of FIG. 3.

FIG. 5 shows an example graphical representation of how the control strategy of the MPC unit 310 may be modified. In this example, the extreme load measures relate to tower loading and the MPC unit 310 considers tower deflection when exercising control of the wind turbine, but the same principles may equally apply to loading on any other parts of the wind turbine, for example loading on the blades. The x-axis of FIG. 5 represents tower deflection (for example, measured in mm, or cm, or metres, etc). The y-axis represents the cost-penalty applied to the tower loading cost in the MPC routine.

MPC TdMax Limit represents an MPC constraint. It can be seen that whilst the amount of tower deflection Td is below this limit, no cost penalty is applied. As soon as Td exceeds this limit, a cost penalty is applied to the tower loading cost in the MPC routine, with the intended consequence of causing the control signals generated by the MPC unit 310 to change in order to avoid tower loading reaching a dangerous level.

In the initial control strategy that is determined based on the simulated distribution of extreme loads, siting uncertainty and the simulation safety margin, MPC TdMax is set to 'Initial MPC TdMax Limit'. It can be seen that Initial MPC TdMax Limit is set such that:

Initial MPC TdMax Limit=Material failure−siting uncertainty−safety margin (simulation)

where material failure is the amount of tower deflection at which material failure is expected.

As explained earlier, through a comparison of the max extreme load value and the design load limit, the siting uncertainty may be reduced or eliminated. Furthermore, the size of the safety margin may be adjusted if desired and the effects on actual tower deflection observed, to ensure that the safety margin is still sufficient large to allow safe operation of the wind turbine. Therefore, modification of the control strategy may involve moving the MPC TdMax limit, such that the modified control strategy has a constraint of 'Modified MPC TdMax limit'.

Figure 6:
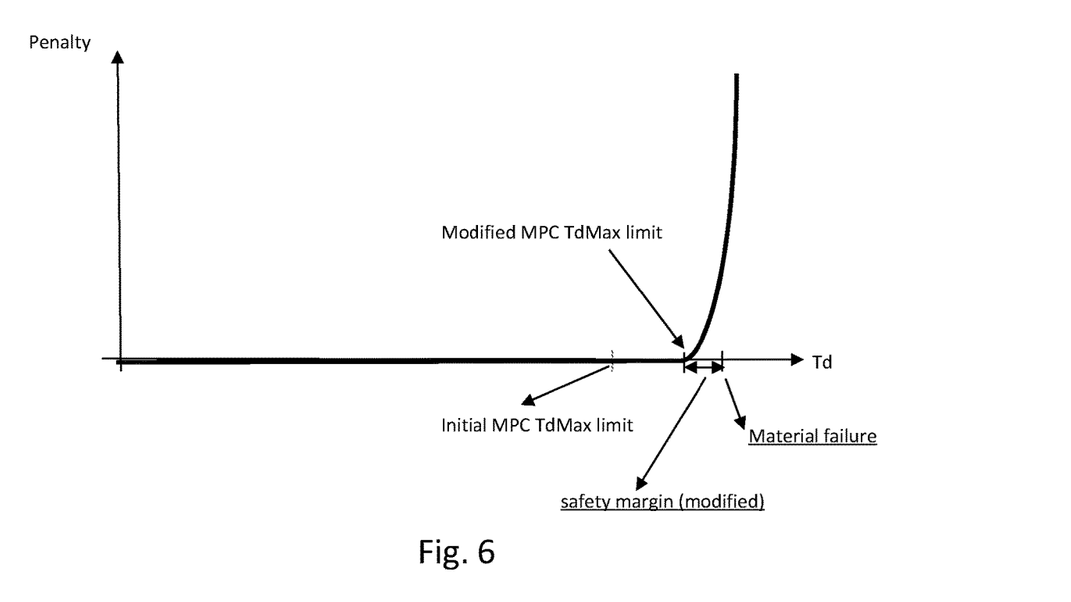
FIG. 6 illustrates an example modified control strategy of the controller of FIG. 3.

FIG. 6 shows an example graphical representation of the modified control strategy of the MPC unit 310. The modified MPC TdMax Limit is set such that:

Modified MPC TdMax Limit=Material failure−safety margin modified)

Thus, it can be seen that since there is no longer any siting uncertainty, and because the safety margin can be set on actual measurements of extreme loading, rather than a simulation, the MPC TdMax Limit constraint can be moved further up the x-axis to allow for larger tower deflections before cost penalties start to be applied. This means that after the control strategy has been modified, the max extreme load value in the distribution of extreme load measures in FIG. 4 should over time start to move upwards in the y-axis direction overtime, thereby reducing the amount of hidden safety. Using the modified control strategy, the MPC unit 310 may be able to drive the wind turbine harder and output more power, whilst still operating safely.

Figure 7:
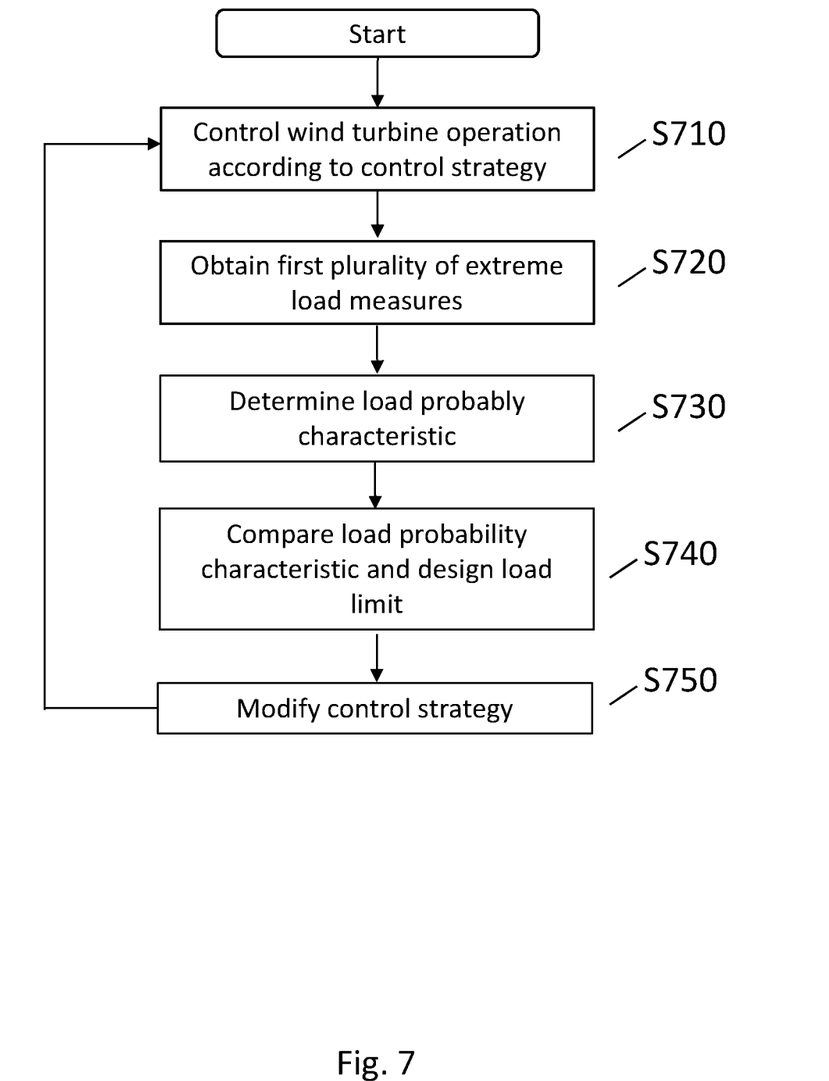
FIG. 7 illustrates a flow diagram of elements of the present disclosure.

FIG. 7 illustrates elements of a method of controlling a wind turbine to perform various embodiments of the present disclosure. The elements of the method may be implemented by software as a computer program product, hardware or a combination of software and hardware. The software may comprise computer readable code, which when executed on the processor of any electronic device, performs the functionality of the elements represented in FIG. 7. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. Typically, the software is stored by and executed by a wind turbine control system.

In Step S710, the control system 20 controls operation of the wind turbine in accordance with a control strategy (for example, the initial control strategy).

In Step S720, a plurality of extreme load measures (for example, the first plurality of extreme load measures) are obtained over a period of time (for example, the first period of time).

In Step S730, a probability characteristic (for example, the max extreme load value) is determined based on a distribution of the plurality of extreme load measures.

In Step S740, the determined load probability characteristic is compared with the design load limit and in Step S750, the control strategy is modified based on that comparison. The method then returns to Step S710 to control the wind turbine based on the control strategy, except the control strategy has now been modified in Step S750.

It will be appreciated that this loop may be repeated may times, potentially over the entire lifetime of the wind turbine (for example, if the wind turbine has an operational life of 20 years, the control strategy may be modified in accordance with this method every minute, or every hour, or every day, or every week, or every month, or every 3 months, or every 6 months, or every year, or every two years, etc for the entire lifetime of the wind turbine). The time period between each modification may be equal or may vary over the lifetime of the wind turbine. Consequently, the control strategy may be gradually refined in order to obtain the best power output of the wind turbine whilst still operating within safe limits.

Although the invention has been described above with reference to one or more preferred embodiments, it will be appreciated that various changes or modifications may be made without departing from the scope of the invention as defined in the appended claims.

For example, whilst the above disclosure focuses particularly on the first plurality of extreme load measures relating to the period of time immediately following installation of the wind turbine and modification of the control strategy being modification of the initial, design stage control strategy, the first plurality of extreme load measures may relate to extreme load measures obtained during any period of time during the life of the wind turbine. In this case, modification of the control strategy is a modification of whatever control strategy is currently in place (which may be the initial, design stage control strategy, or may be some other already previously modified control strategy).

Whilst one particular example of control strategy modification is given with reference to changing a constraint within the MPC routine, it will be appreciated that the control strategy may be modified in any other suitable way based on the comparison of the max extreme load value and the design load limit, for example by modifying one or more cost weightings within the MPC routine.

Furthermore, whilst in the above description, the max extreme load value is determined based on the distribution of extreme load measures and then compared with the design load limit, in an alternative any other statistical analysis may be performed on the distribution of the extreme load measures in order to determine any other suitable load probably characteristic. For example, a different threshold percentile may be used, or a probability characteristic relating to the mean, or variance, or median, etc of the distribution may be determined. This may then be compared with the design load limit as appropriate. It can therefore also be appreciated that whilst the comparison of the load probability characteristic and the design load limit is generally described above as a finding of the difference between the two, the comparison may alternatively take any other suitable form depending on the nature of the load probability characteristic.

In the explanation above, the adapter unit determines the plurality of extreme load measures based on the one or more load measures 335. However, in an alternative, the adapter unit 320 may simply receive the plurality of extreme load measures, for example from the load estimator (which may be configured to determine the extreme load measures and provide them to the adapter unit 320), or from any other suitable unit or entity. Therefore, the adapter unit 320 is configured to obtain the plurality of extreme load measures either by determining them for itself, or by receiving them from another unit/entity.

The invention claimed is:

1. A method of controlling an operation of a wind turbine, the method comprising:
   controlling the operation of the wind turbine in accordance with a safety margin for a first period of time;
   obtaining a first plurality of extreme load measures indicative of extreme loads experienced by at least part of the wind turbine during the first period of time;
   determining, by statistical analysis, a load probability characteristic based on a distribution of at least the first plurality of extreme load measures;
   comparing the load probability characteristic and a design load limit;
   reducing the safety margin based at least in part on the comparison of the load probability characteristic and the design load limit;
   controlling the operation of the wind turbine in accordance with the reduced safety margin for a second period of time such that the wind turbine allows higher extreme loads than during the first period of time;
   obtaining a second plurality of extreme load measures indicative of extreme loads experienced by at least part of the wind turbine during the second period of time;
   determining, by statistical analysis, an updated load probability characteristic based on a distribution of at least the first plurality of extreme load measures and the second plurality of extreme load measures;
   comparing the updated load probability characteristic against the design load limit;
   further reducing the safety margin based at least in part on the comparison of the updated load probability characteristic against the design load limit; and
   controlling the operation of the wind turbine using the further reduced safety margin for a third period of time.

2. The method of claim 1, wherein the load probability characteristic comprises a max extreme load value indicative of a value of extreme load corresponding to a threshold percentile of the distribution of the plurality of extreme load measures.

3. The method of claim 2, wherein the comparison of the load probability characteristic and the design load limit comprises a difference between the max extreme load value and the design load limit.

4. The method of claim 3, wherein reducing the safety margin is further based at least in part on one of a magnitude or a sign of the difference between the max extreme load value and the design load limit.

5. The method of claim 1, wherein the design load limit is based at least in part on a material failure load value, a siting uncertainty value, and a simulated safety margin.

6. The method of claim 1, wherein the first plurality of extreme load measures comprise a plurality of estimates of extreme load, and wherein the method further comprises:
   receiving a plurality of operational state measurements of the wind turbine during the first period of time; and
   determining the first plurality of extreme load measures based at least in part on the plurality of operational state measurements.

7. The method of claim 1, wherein the safety margin and the reduced safety margin are defined within a model predictive control (MPC) routine.

8. The method of claim 7, wherein reducing the safety margin based at least in part on the comparison of the load probability characteristic and the design load limit comprises adjusting at least one cost weighting within the MPC routine based at least in part on the comparison of the load probability characteristic and the design load limit.

9. The method of claim 7, wherein reducing the safety margin based at least in part on the comparison of the load probability characteristic and the design load limit comprises adjusting at least one constraint of the MPC routine based at least in part on the comparison of the load probability characteristic and the design load limit.

10. The method of claim 1, wherein the distribution of at least the first plurality of extreme loads is determined based on the first plurality of extreme loads and a simulated load distribution.

11. The method of claim 1, wherein the statistical analysis further comprises a Bayesian analysis.

12. A non-transitory computer readable medium storing a computer program configured to perform an operation when executed on a processor of an electronic device, the operation comprises:
controlling the operation of a wind turbine in accordance with a safety margin for a first period of time;
obtaining a first plurality of extreme load measures indicative of extreme loads experienced by at least part of the wind turbine during the first period of time;
determining, by statistical analysis, a load probability characteristic based on a distribution of at least the first plurality of extreme load measures;
comparing the load probability characteristic and a design load limit;
reducing the safety margin based at least in part on the comparison of the load probability characteristic and the design load limit;
controlling the operation of the wind turbine in accordance with the reduced safety margin for a second period of time such that the wind turbine allows higher extreme loads than during the first period of time;
obtaining a second plurality of extreme load measures indicative of extreme loads experienced by at least part of the wind turbine during the second period of time;
determining, by statistical analysis, an updated load probability characteristic based on a distribution of at least the first plurality of extreme load measures and the second plurality of extreme load measures;
comparing the updated load probability characteristic against the design load limit;
further reducing the safety margin based at least in part on the comparison of the updated load probability characteristic against the design load limit; and
controlling the operation of the wind turbine using the further reduced safety margin for a third period of time.

13. A control system for a wind turbine, comprising:
a processor configured to:
control an operation of the wind turbine using a safety margin for a first period of time;
obtain a first plurality of extreme load measures indicative of extreme loads experienced by at least part of the wind turbine during the first period of time;
determine, by statistical analysis, a load probability characteristic based on a distribution of the first plurality of extreme load measures;
compare the load probability characteristic against a design load limit;
reduce the safety margin based at least in part on the comparison of the load probability characteristic against the design load limit;
control the operation of the wind turbine using the reduced safety margin for a second period of time such that the wind turbine allows higher extreme loads than during the first period of time;
obtain a second plurality of extreme load measures indicative of extreme loads experienced by at least part of the wind turbine during the second period of time;
determine, by statistical analysis, an updated load probability characteristic based on a distribution of at least the first plurality of extreme load measures and the second plurality of extreme load measures;
compare the updated load probability characteristic against the design load limit;
further reduce the safety margin based at least in part on the comparison of the updated load probability characteristic against the design load limit; and
control the operation of the wind turbine using the further reduced safety margin for a third period of time.

14. The control system of claim 13, wherein the control system is implemented in the wind turbine.

* * * * *